United States Patent [19]

Hibarger et al.

[11] 4,150,909
[45] Apr. 24, 1979

[54] BREAKWATER SYSTEM

[76] Inventors: George E. Hibarger; George G. Hibarger; David W. Daniel, all of P.O. Box 7531, all of Tulsa, Okla. 74105

[21] Appl. No.: 867,801

[22] Filed: Jan. 9, 1978

[51] Int. Cl.² .................................................. E02B 3/12
[52] U.S. Cl. ...................................... 405/27; 24/72.7; 24/201 A
[58] Field of Search ............... 61/4, 5, 3, 1, 37, 38, 61/48; 24/72.7, 201 A

[56] References Cited

U.S. PATENT DOCUMENTS

| 3,276,210 | 10/1966 | Stitt | 61/5 |
| 3,842,606 | 10/1974 | Stiles et al. | 61/38 |
| 3,928,701 | 12/1975 | Rohmer | 61/4 X |

FOREIGN PATENT DOCUMENTS 394334 6/1933 United Kingdom ............... 24/150 FP

*Primary Examiner*—Jacob Shapiro
*Attorney, Agent, or Firm*—Head, Johnson & Chafin

[57] ABSTRACT

A floating breakwater made up of an array of interlocking annular buoyant members of noncorrosive material and including a method of splicing scrap vehicle tires using only tire material or other nondeteriorating material to construct said array of interlocking tires.

11 Claims, 9 Drawing Figures

U.S. Patent Apr. 24, 1979 Sheet 2 of 3 4,150,909
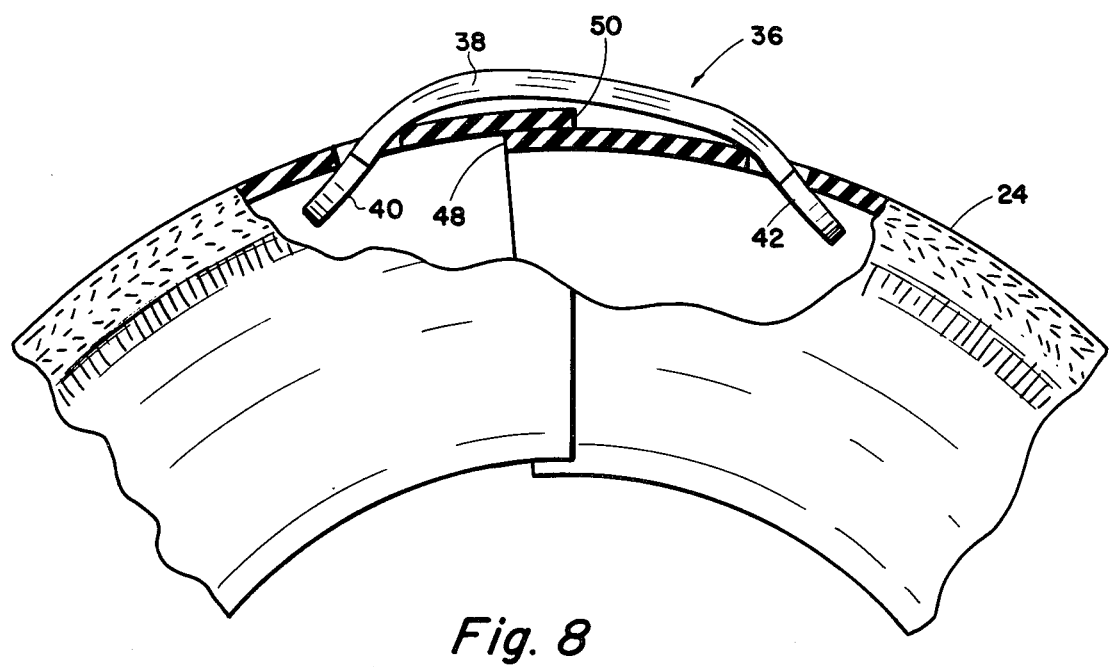
Fig. 8
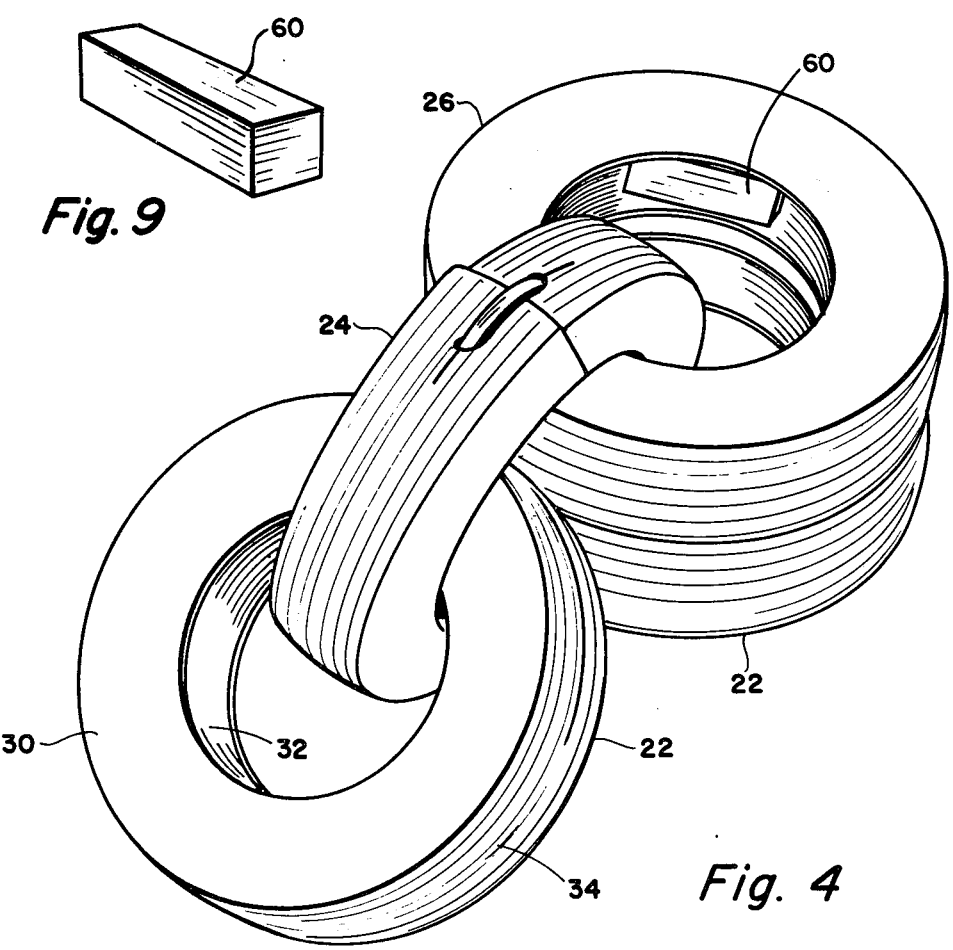
Fig. 9
Fig. 4

BREAKWATER SYSTEM

BACKGROUND OF THE INVENTION

1. Field of the Invention

The present invention relates to breakwaters and more particularly to a floating breakwater comprising an array of buoyant annular members and more particularly, but not by way of limitation, to a floating array of interlocked vehicle tires.

2. History of the Prior Art

Marinas, boat mooring locations and the like, whether located near the ocean or on a lake shore require protection from waves by some sort of breakwater system. To construct a breakwater by conventional methods of depositing rock into an elongated strip is very expensive and, where the water is deep or the bottom is soft, this method is not feasible for most operations.

Another seemingly unrelated problem exists in the disposal of used automobile and truck tires. One reliable source has estimated that there is an existing stockpile of more than 2 billion scrap tires in the United States which can probably be obtained for little or no cost other than that of transportation and handling. There is also evidence that the stockpile of scrap tires is growing which can create an ecological problem in and of itself. In most cases, it is unlawful to dispose of the scrap tires by burning or in land fills. Tires may be disposed in land fills where they are first cut into relatively small flat pieces.

Since these tires are buoyant in water, one of the present inventors has recognized the value of utilizing such scrap tires as a floating breakwater as evidenced by his prior U.S. Pat. No. 3,357,192 issued Dec. 12, 1967, to George Hibarger for "Breakwaters."

During the inventors' study of the use of tires as a floating breakwater, it has been found that there is very litter problem with the tires decomposing, breaking down or otherwise deteriorating. They seem to take on a coating of algae and their deterioration is imperceptible over a reasonable period of time.

The weak link in the system of creating breakwaters out of vehicle tires turns out to be the cables or tying materials which are used to lash the tires together. Further, these tying materials represent the bulk of the expense in construction of such floating breakwaters.

SUMMARY OF THE INVENTION

The present invention provides a floating breakwater consisting of a rectangular array of scrap tires interlocked together in a manner which entirely eliminates the use of tying cables to lash the tires together except for the use of cables in anchoring the floating array in position.

The present invention provides a unique tire splice in which the tires may be interlocked together so that only tire material is used to construct the floating body thereby eliminating the need for lashing the tires together by cable, ropes, or the like which are subject to corrosion and deterioration.

The splice comprises the use of an elongated splice member, several of which may be cut from a single tire. The splice member consists of a strip of tire member having enlarged end lobes.

The tire to be spliced is radially severed and splice receptacle holes are cut into the tire on either side of the sever. The free ends produced by severing the tire are brought into overlapping engagement and the enlarged end lobes of the splice member are then inserted into the receptacle holes to secure the splice together.

The invention further provides an unique interlocking scheme whereby the breakwater is made up of a plurality of longitudinal rows of interlocking annular members or tires, the adjacent rows being connected by annular cross members connected to adjacent pairs of spliced tires of each row in a manner that will be hereinafter more fully set forth.

DESCRIPTION OF THE DRAWINGS

Other and further advantageous features of the present invention will hereinafter more fully appear in connection with a detailed description of the drawings in which:

FIG. 4 is a prospective view of a group of four interlocking members joined together for assembly into a floating breakwater.

FIG. 8 is a partial sectional plan view of a spliced tire of FIG. 7.

FIG. 9 is a prospective view of an auxiliary flotation block.

DESCRIPTION OF THE PREFERRED EMBODIMENT

Figure 2:
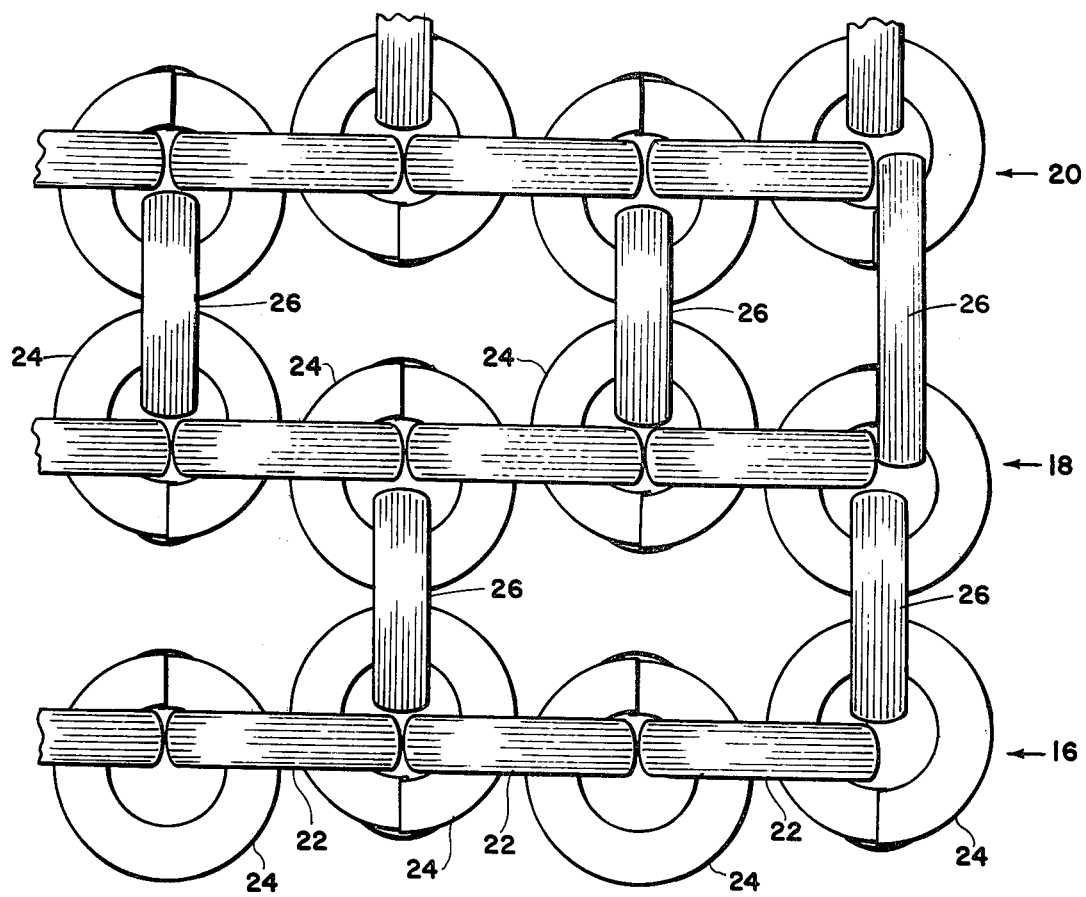
FIG. 2 is a partial plan view of the breakwater of FIG. 1.

Referring to the drawings in detail, reference character 10 generally indicates a floating breakwater system made up of an interlocking array of buoyant annular members generally indicated by reference character 12, the floatable array being held in place by a plurality of anchoring cables 14 which are in turn attached to submerged anchors (not shown).

The array of interconnected annular members is substantially made up of the plurality of longitudinal rows of interconnected members such as the rows identified in FIG. 2 by an edge row 16, a second adjacent row 18 and a third row 20 adjacent to the row 18, and etc. Each row, in turn, is made up of every other annular member 22 being vertically disposed and being interconnected by horizontally disposed spliced annular members 24.

In order to connect the edge row 16 to the next adjacent row 18, a plurality of annular members 26 are connected between every second spliced annular member 24. Although the annular members 26 are substantially identical to the annular members 22, they will be hereinafter referred to as annular cross members. Therefore, it can be said that adjacent rows are connected by annular cross members 26 secured between every fourth pair of annular members in adjacent rows or every second pair of spliced annular members 24 of adjacent rows.

Figure 1:
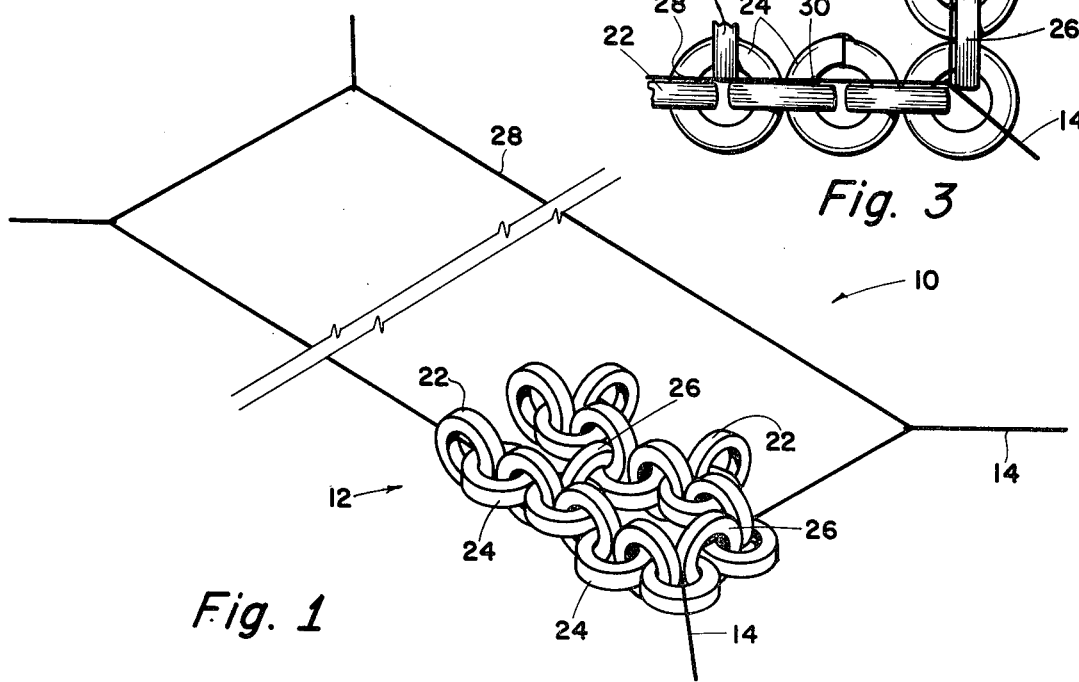
FIG. 1 is a prospective view of a floating breakwater embodying the present invention.

Row 18 is then similarly connected to the next adjacent row 20 by annular cross members 26 being connected between adjacent pairs of spliced members 24 which were unused in the previous interconnection. Therefore, it can be said that each longitudinal interconnecting row of annular members is attached to its adjacent row of annular members by interconnecting annular members at every fourth annular member in each row. This scheme will provide a rectangular array of interconnecting annular members to form the floating breakwater as shown in FIG. 1.

For either construction, several workers may be put on the task of assemblying groups of four annular members as shown in FIG. 4 consisting of two annular members 22, which will become a part of a longitudinal row, a third annular member 26, which will become an annular cross member, these three annular members being connected together by spliced annular member 24. After these units of four annular members are assembled they may be interconnected by a plurality of spliced annular members to form the array as shown in FIGS. 1 and 3.

Figure 3:
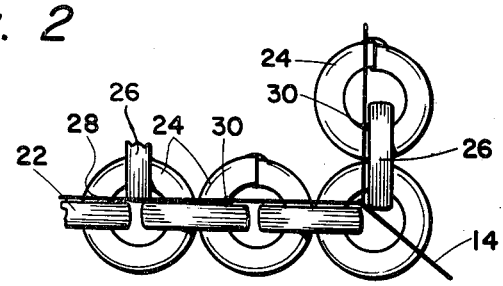
FIG. 3 is a plan view of one corner of the breakwater of FIG. 1.

Referring back to FIGS. 1 and 2, the anchor cables 14 may also include a rectangular group of cables 28 which is of a similar shape and size to the finished array of interconnected annular members 12 and may be clamped to the annular members by a suitable cable clamp 30 as shown in FIG. 3. Naturally, any suitable attachment of the cable members 14 and 28 may be made for anchoring the tires without departing from the scope of this invention.

Figure 6:
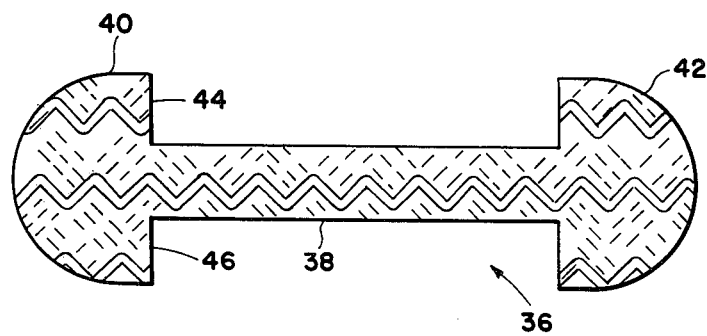
FIG. 6 is a side view of the splice member.

Referring to FIG. 4, the typical vehicle tire is made up of a pair of opposite sidewalls 30 and 32 joined around the outer edge by a tread surface 34. The tread surface 34 of the tire may be cut away from the sidewalls in order to provide material for making a plurality of splice members generally indicated by reference character 36 and shown in detail at FIG. 6. In constructing the splice members 36, several such splice members can be constructed from a single tire tread. It is also recognized that the splice member 36 can be made of any suitable material and need not be made from a scrapped tire.

The splice member 36 comprises an elongated strip 38 having semi-circular shaped enlarged end lobes 40 and 42 at each end thereof. The flat portion of the semi-circular end lobes will result in shoulder surfaces 44 and 46 on either side of the strip 38 for a purpose that will be hereinafter set forth.

Figure 5:
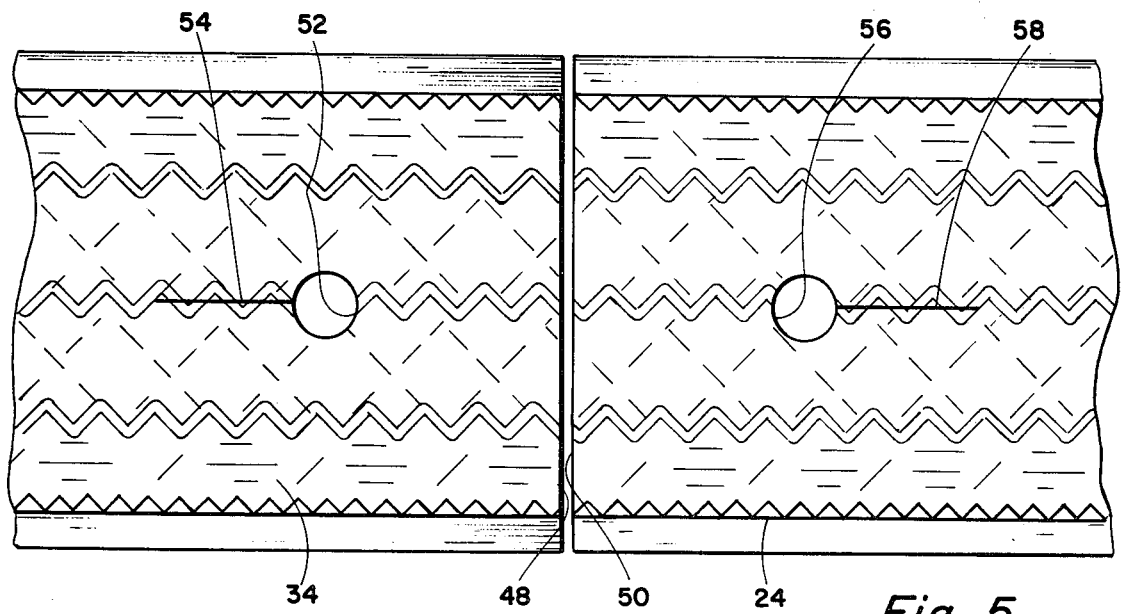
FIG. 5 is a partial side view of a tire prepared for splicing.

In order to prepare a tire for interlocking with another tire, it is necessary to radially sever the tire as shown in FIG. 5 which provides abutting end portions 48 and 50 as shown. A first centrally disposed hole at 52 is provided through the thread 34 near the end portion 48 of the severed tire and having a diameter substnatially equal to the width of the elongated strip 38 of the splice member 36. A single cut or slice 54 is then provided in the tread portion 34 and extends from one edge of the hole 52 longitudinally along the tread in a direction opposite from the abutting end portions 48 and 50. A second centrally disposed hole 56 is provided in the tread portion 34 and is spaced a like distance from the abutting end portion 50 and likewise contains a cut or slit 58 which extends in a direction opposite the abutting end portion. The spacing of the holes 52 and 58 from the abutting end portions 48 and 50 are less than one-half the length of the narrow strip 38 of the splice member 36.

Figure 7:
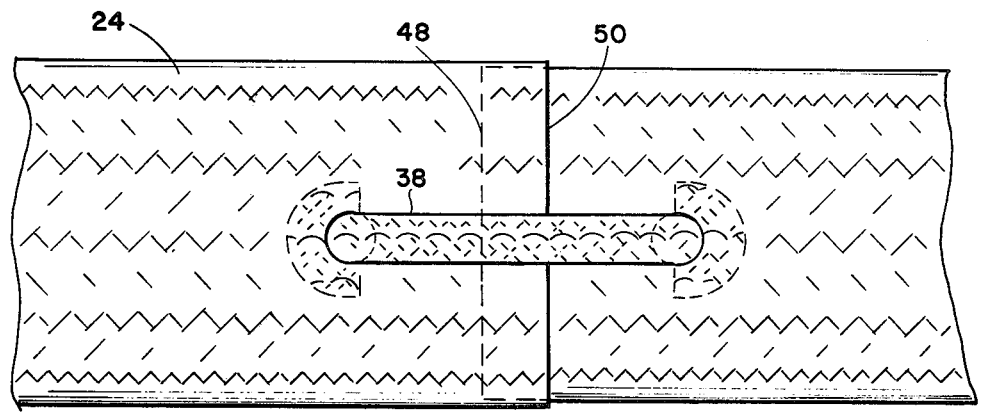
FIG. 7 is a partial side view of a tire with the splice member installed.

In order to join two ends of the splice tire 24, the aubtting end portions 50 and 48 are pulled into overlapping engagement as shown in FIG. 7. The semi-circular enlarged lobe 40 is then inserted edgewise through the hole 52 and slit 54 so that the entire lobe 40 is inside the tire beneath the tread 34. The enlarged end portion 40 is then turned 90° and pulled tightly so that the strip 38 extends out of the hole 52 and the shoulders 44 and 46 to prevent the enlarged end portion 40 from exiting the hole.

Likewise the opposite enlarged end portion 42 is turned edgewise and inserted through the hole 56 and associated slit 58 and then rotated back 90° so that the splice is completely locked into place as shown in the side view of FIG. 7 and the plan view of FIG. 8. The tendency of the tire to try to open back up due to the overlap will keep the splice member relatively tight and prevent it from working loose.

It has been found that a cutting operation consisting of utilization of a hydraulic punch is effective for cutting out the shaped splice members 36 and for also cutting the holes 52 and 56 in their associated slits 54 and 58. Further, it can be seen that the tires may be disconnected by rotating and removing the splice member 36.

For example, the splice strip member 36 may be longer than the distance between the bores 52 and 56 so that more than three tires may be joined by one spliced tire.

It is also noted that flotation blocks 60 may be inserted in the tires 22 and 26 to improve buoyancy where needed. The flotation block 60 is sized such that the side walls may be opened and the blocks inserted into the tire cavity. The block 60 is then held in place due to the size being larger than the opening after the side walls assume their original configuration.

From the foregoing, it is apparent that the present invention provides a method of splicing scrapped vehicle tires such that the tires may be interlocked into a rectangular array for creating a floating breakwater in which the interconnection means is not subject to corrosion as with metal interconnecting cables nor subject to the deterioration present with the utilization of ropes and the like.

Whereas, the present invention has been described in particular relation to the drawings attached hereto, other and further modifications apart from those shown or suggested herein may be made within the spirit and scope of the invention.

What is claimed:

1. A spliced vehicle tire comprising:
   (a) a vehicle tire radially severed to form a pair of abutting ends;
   (b) a pair of apertures through the tire material oppositely disposed on either side of the sever, a pair of elongated slits in the tire material, one in communication with each aperture and extending in opposite directions;
   (c) an elongated splice member comprising an elongated strip, the cross-sectional size of the strip being compatible with the size of the apertures, a pair of enlarged end lobes, one on each end of the strip, the size of each end lobe being compatible with the combined length of the elongated slit and aperture;
   whereby each end lobe is removably insertable in opposite apertures in order to hold the tire in substantially annular configuration.

2. A spliced vehicle tire as set forth in claim 1 wherein the apertures are in the tread portion of the tire.

3. A spliced vehicle tire as set forth in claim 2 wherein the splice member is of tire material.

4. A spliced vehicle tire as set forth in claim 3 wherein the splice member is of tread material.

5. A spliced vehicle tire as set forth in claim 4 wherein the enlarged end lobes of the splice member have a flat inside edge forming shoulders on each side of the strip and wherein the outer edges of the said lobes are provided with a convex curvature.

6. A method of constructing a spliced vehicle tire for use as a connecting annular member comprising the steps of:
  (a) radially severing the tire to form two abutting ends;
  (b) cutting a pair of oppositely disposed elongated apertures, one on each side of the sever;
  (c) inserting an enlarged substantially flat end portion of the elongated splice member through one aperture;
  (d) pulling the abutting ends of the tire into overlapping engagement and inserting an opposite similar enlarged end portion of said elongated splice member through the other aperture; and
  (e) rotating the plane of the enlarged end portions substantially parallel to the plane of the tire material adjacent the bores for holding said tire in an annular configuration.

7. A floating breakwater of interlocking buoyant annular members comprising at least three rows of interlocking vertically and horizontally disposed annular members, adjacent rows being connected by similar annular cross-members interlocking selective adjacent pairs of horizontally disposed annular members in each row, and wherein the annular cross-members are connected to every second annular member of each interior row, every second cross-member connected to the adjacent row on one side, the remaining cross-members being connected to the adjacent row on the opposite side.

8. A floating breakwater as set forth in claim 7 wherein the buoyant annular members are vehicle tires and where every other annular member in each row is a spliced tire, the annular cross member being connected to said spliced tires.

9. A floating breakwater as set forth in claim 8 wherein each spliced tire is held together by a splice member of tire material.

10. A floating breakwater as set forth in claim 9 wherein each annular member comprises a vehicle tire provided with a radial sever therethrough to form free abutting ends, a pair of apertures equally spaced of opposite sides of the sever, an elongated slit in the tire extending from each aperture in opposite directions away from the sever, a splice member of tire material comprising an elongated strip having width substantially equal to the diameter of the apertures and length shorter than the distance between the apertures when the severed ends are abutted, enlarged end pieces at each end of the elongated strip, each having a width substantially equal to the combined length of each slit and associated aperture, whereby the free ends of the tire at the sever are overlapped and the enlarged end pieces of the splice member are removably insertable through the slits and rotated so that the plane of the splice is substantially parallel to the plane of the tire material adjacent the apertures.

11. A floating breakwater of interlocking buoyant annular members wherein each annular member comprises a vehicle tire provided with a radial sever therethrough to form free abutting ends, a pair of apertures equally spaced of opposite sides of the sever, an elongated slit in the tire extending from each aperture in opposite directions away from the sever, a splice member of tire material comprising an elongated strip having width substantially equal to the diameter of the apertures and length shorter than the distance between the apertures when the severed ends are abutted, enlarged end pieces at each end of the elongated strip, each having a width substantially equal to the combined length of each slit and associated aperture, whereby the free ends of the tire at the sever are overlapped and the enlarged end pieces of the splice member are removably insertable through the slits and rotated so that the plane of the splice is substantially parallel to the plane of the tire material adjacent the apertures.

* * * * *